United States Patent [19]
Fidler et al.

[11] Patent Number: 6,136,216
[45] Date of Patent: Oct. 24, 2000

[54] AEROGEL-IN-FOAM THERMAL INSULATION AND ITS PREPARATION

[75] Inventors: Carrielee Fidler; Thomas C. Simonton, both of Willow Street, Pa.

[73] Assignee: Armacell LLC, Germany

[21] Appl. No.: 08/642,783

[22] Filed: May 3, 1996

Related U.S. Application Data

[62] Division of application No. 08/288,617, Aug. 10, 1994, Pat. No. 5,569,513.

[51] Int. Cl.$^7$ .................................................. B32B 5/18
[52] U.S. Cl. .................. 252/62; 264/45.3; 428/317.9; 106/122; 106/135.1; 106/159.1
[58] Field of Search ................................. 521/905, 54, 55, 521/91, 50; 428/304.4, 317.9; 264/45.3; 528/310; 252/62; 106/122, 135.1, 159.1

[56] References Cited

U.S. PATENT DOCUMENTS

| | | | |
|---|---|---|---|
| 3,598,157 | 8/1971 | Farr et al. | 138/157 |
| 3,814,808 | 6/1974 | Schwendeman et al. | 424/360 |
| 4,086,331 | 4/1978 | Neumann | 424/45 |
| 4,331,547 | 5/1982 | Stotts et al. | 252/62 |
| 4,402,927 | 9/1983 | von Dardel et al. | 423/335 |
| 4,530,905 | 7/1985 | Freedman | 435/177 |
| 4,954,327 | 9/1990 | Blount . | |
| 5,137,927 | 8/1992 | Wolff et al. | 521/54 |

*Primary Examiner*—Elizabeth M. Cole
*Attorney, Agent, or Firm*—Womble Carlyle Sandridge & Rice, PLLC

[57] ABSTRACT

Insulative compositions are prepared by agitating an aqueous mixture of aerogel and gelatin. Insulation obtained with such methods is non-toxic, environmentally safe, fire resistant with low smoke, has good handling properties, and provides low thermal conductivities. The insulation can be made in sheets, loose fill, or can be molded into particular shapes to provide particular types of insulation such as pipe insulation.

17 Claims, 2 Drawing Sheets

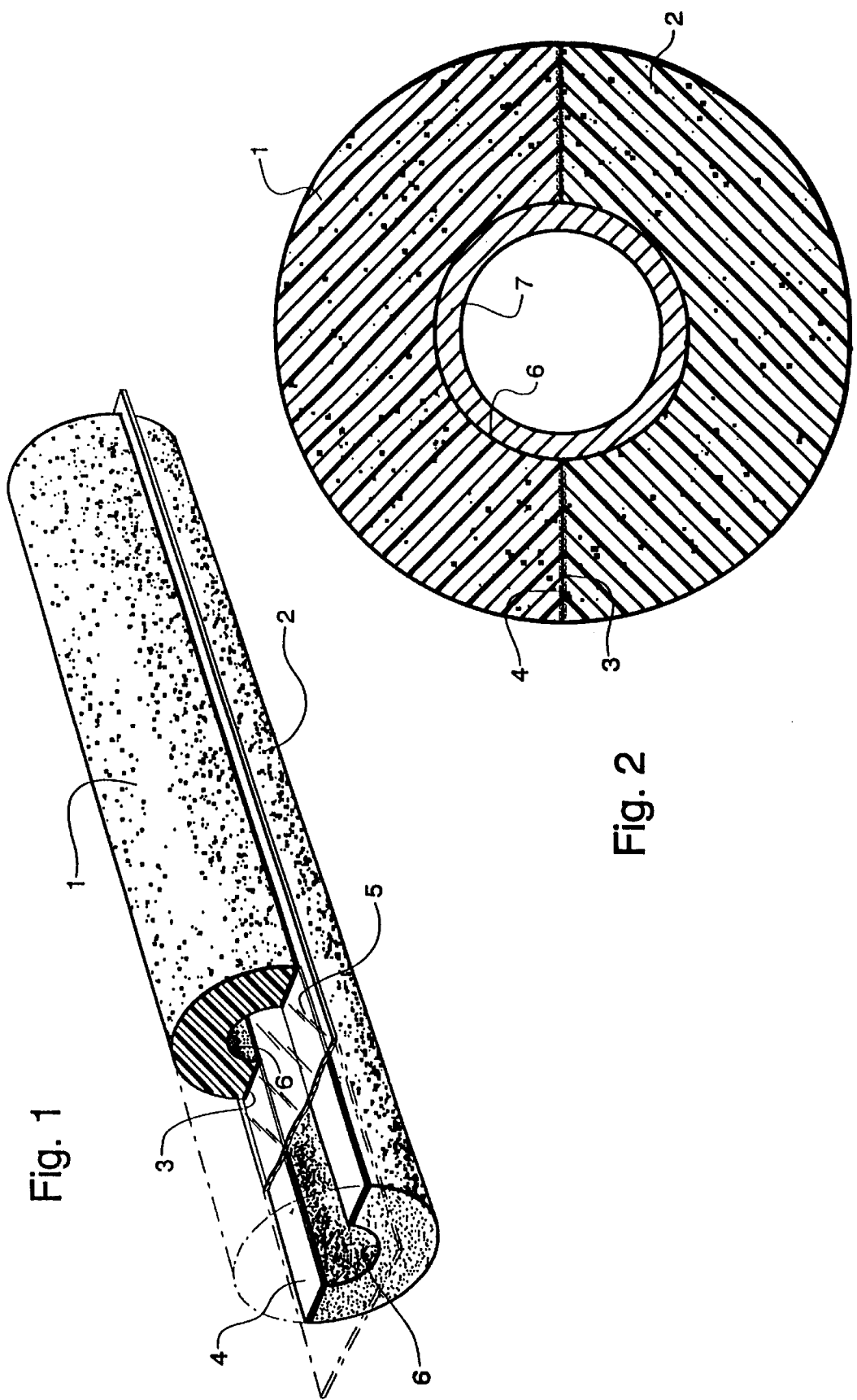

AEROGEL-IN-FOAM THERMAL INSULATION AND ITS PREPARATION

CROSS-REFERENCE TO RELATED APPLICATION

This is a divisional of application Ser. No. 08/288,617, filed Aug. 10, 1994, now U.S. Pat. No. 5,569,513.

BACKGROUND OF THE INVENTION

Field of the Invention

This invention describes thermally insulative aerogel-containing foam compositions, a composite insulation which these compositions can provide, and their preparation.

Thermal insulation is an important and valuable product. Although many insulative compositions are already in use, there is a continuing desire for energy conservation pushing a drive to achieve insulation having lower thermal conductivity ($T^k$).

In addition to a low $T^k$, furthermore, insulation ideally should have other qualities. Low flammability and low smoke are particularly important for use in both business and residential structures. It should also be easily prepared, non-toxic, environmentally safe in both use and preparation, and it should have good handling properties. Insulation which is capable of being molded into large sheets or other needed shapes, and which has sufficient flexibility and compressibility to be transported, handled and installed in homes, buildings, and even manufactured goods is called for.

Present forms of thermal insulation include foams. Foams which require blowing agents, however, can be detrimental to the environment and difficult to make. The foamed insulation also can have the disadvantage of the flammability of the foam itself, and frequently the added problem of toxic smoke even with, and sometimes because of added flame retardants.

Aerogels are known to be advantageously insulative; but, as insulation, they are disadvantageous in several ways. As a loose fill, aerogel is dusty, and is prone to settling over time. In addition to this, the aerogel is brittle, non-flexible and when compressed it fractures. As a result, aerogel can't be flexed during use. An attempt to compress or flex large pieces of it will result in breaking them. Transportation, handling and installation are difficult with aerogels due to the lack of shock resistance and flexibility.

Thus, there is need for the thermally insulative composites which are described herein. The present invention provides thermal insulation having a low $T^k$, good handling properties, fire resistance, low smoke, and which is also environmentally safe and is easily made.

SUMMARY OF THE INVENTION

Thermally insulative composite compositions can be prepared using a process which comprises combining an aqueous gelatin solution and an aerogel and agitating this mixture to form a foam. The foam is then dried to provide a composite composition having a low $T^k$, good handling properties, low flammability, and low smoke. Both the process and its insulative product are environmentally safe, and provide good thermal insulation.

Hydrophobic aerogel and an aqueous gelatin can be used to prepare the insulative composite compositions of the present invention. With the foamed gelatin and aerogel combination, the present composites can provide thermal insulation with a thermal conductivity less than about 0.032 watt/meter-K° (W/mK).

The thermal insulation provided by the composite composition comprises a composite composition of foamed gelatin and an aerogel. The maximum amount of aerogel will be about 98% by dry weight; acceptably, the aerogel can be present in the foam composites at a minimum amount of at least about 5% by weight. Where the present composites are insulation, however, the aerogel concentration will be maintained at a higher level, in the range of from about 98% to about 53% by dry weight of the total composite composition.

The maximum amount of gelatin will be about 47% by dry weight of the total composition. Acceptably, there is at least about 2% (by dry weight) of gelatin in the composite foam. The gelatin has a minimum Bloom of at least about 60.

The present composition can be made into pipe insulation. Advantageously, the insulative composite can be molded or otherwise shaped into a pipe covering material which is also insulative and can be secured around a pipe to cover it and provide effective insulation for the pipe.

As pipe insulation the composite composition forms substantially identical sections which, when put together, form the hollow structure, shaped so that it can snugly embrace the pipe to be covered. Each section has mating surfaces which, when put together form a tubular shaped hollow structure with a central bore that has a size which allows it to snugly embrace the pipe to be covered. Preferably, the foam pipe insulation is in two substantially identical sections with mating surfaces which, when put together, form the hollow structure, which can snugly embrace the pipe. Each section has mating surfaces.

To close, and hold the insulation to the pipe, any suitable means can be used. For example, a pipe wrap can be put around the outside of the foam, holding the mating surfaces together and holding the insulation on the pipe. Alternatively, an adhesive coating can be put on at least one surface which will be brought into contact with and hold the mating surface (which can also optionally have adhesive) on the other section of pipe covering. Preferably, both surfaces will have an adhesive so that the sections will be secured to each other and held together by the cohesion of the adhesives. A layer of protective sheet material can be put over the adhesive on the coated surface of each pipe covering section to keep it from sticking until it is ready for installation. The present pipe insulation can also be fitted with the closing system described in U.S. Pat. No. 4,748,060. Commercially available pipe jacketing can also be used.

BRIEF DESCRIPTION OF THE DRAWINGS

FIG. 1 is a view of the pipe insulation showing substantially identical mating sections 1 and 2 of the pipe covering. Each of the sections has an adhesive coated mating surface 3 and 4 of each section with the protective sheet of release paper 5 in between the mating surfaces to prevent them from sticking to each other. When the sections 1 and 2 are placed together they form a tubular structure which is a jacket for the pipe. The tubular structure (or jacket) has a bore 6 which has a suitable size to receive a pipe.

FIG. 2 is a cross sectional view through the pipe covering and pipe 7 which it covers. Mating sections 1 and 2 are shown along with the mating surfaces 3 and 4, the bore 6 and pipe 7.

DETAILED DESCRIPTION

Figure 3:
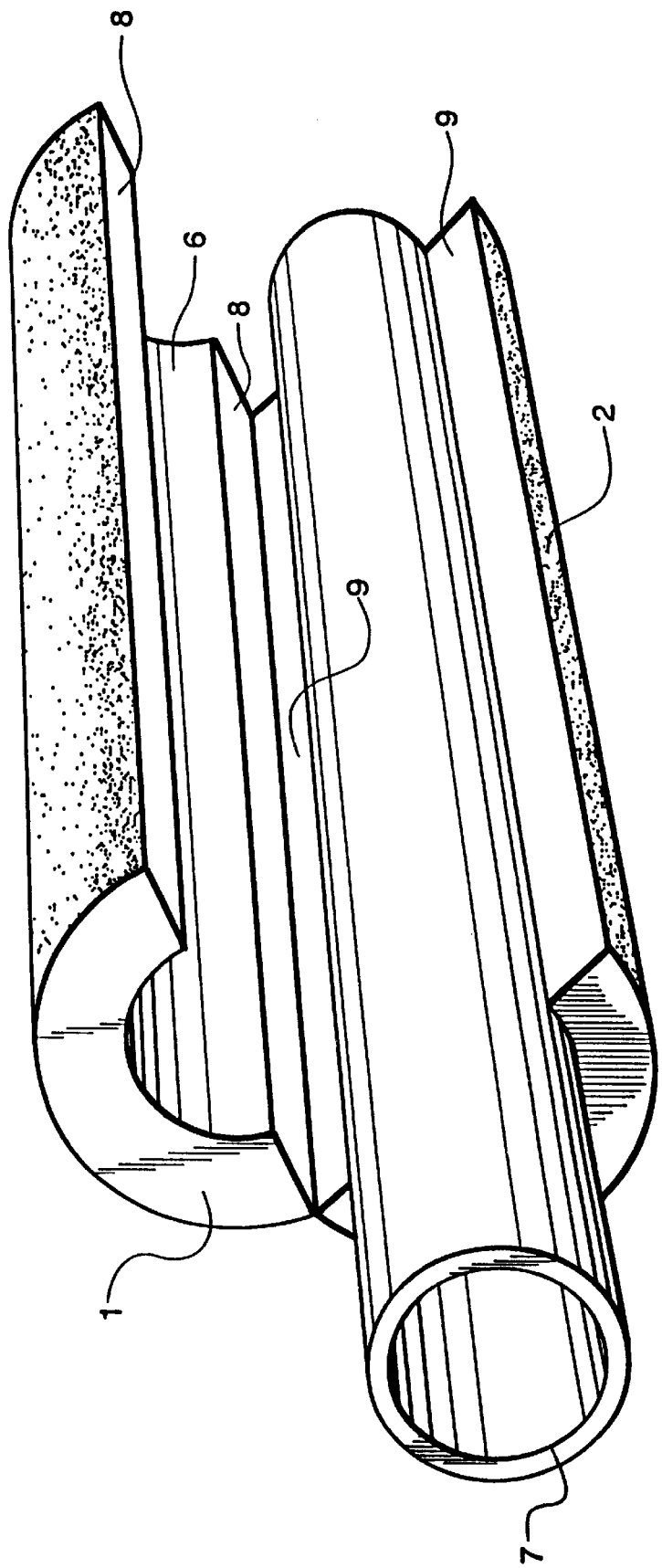
FIG. 3 is a view of the pipe insulation covering (jacket) which is in an open position with a pipe 7 in one section and the exposed, substantially identical mating surfaces 8 and 9. The two sections can be placed together and secured by suitable means for holding the sections in place (such as ties or cladding). Alternatively, as in FIG. 1, a pressure sensitive adhesive can be used so that the two identical mating sections 1 and 2 can be put together so that the mating surfaces touch and stick to each other.

Advantageously, the present insulative, foamed composites can be prepared by mixing the water and the dry gelatin to form the aqueous gelatin solution. The amount of water used in the process is that amount which will be high enough to be effective to wet the dry ingredients and dissolve the dry gelatin, but it is low enough to also allow the mixture to foam. The combination of dry gelatin and water are mixed until the liquid is clear; suitably, it is mixed at a temperature in the range of from about 33 to about 37° C. When the mixture becomes clear, this aqueous gelatin solution can then be combined with the aerogel. Agitation is used to form the foam.

The dry foam composites prepared using the processes described herein can be used to provide insulation or objects which must have low thermal conductivity. As insulation, the composite compositions, advantageously have low flammability and low smoke characteristics.

Preferably, the water is present in the wet composite mixture at a maximum of about 60% by total processing wt. (the weight of all ingredients in the process, including the water). Preferably, the amount of water used in this process is from about 45% to about 60% by total processing wt. Although the water could be present at up to about 75% by processing weight, it is preferably minimized in order to increase the density and dry strength of the foam. Broadly, the amount of water can range from about 75% to about 35% by total processing weight. In preferred processes features such as high agitation and/or a surfactant are used in order to help form a good foam.

After mixing the solution and the dry ingredients, the combination is then given an effective amount of agitation to make the foam and the wet foam is then dried to provide the product. While wet, the foam can be put into a mold having a configuration which is designed to give the composite product a needed shape. Alternatively, it can be sheeted out in a continuous process or put directly into place (with proper ventilation) followed by drying.

Drying can be done at any suitable temperature which is low enough to allow the foam to dry without melting the foamed gelatin. In the most preferred processes the wet composite is heated to accelerate the drying step.

In another preferred embodiment, blowing is used to increase air circulation during drying; in most preferred drying steps, dry air is blown over the foam being dried.

If the foam has been crosslinked (by using a gelatin crosslinker in the process), drying can be done at a temperature up to about 200° F. With no crosslinking of the gelatin, the temperature should acceptably be a maximum of about 90° F. until the foam is substantially dry. If wet foam is subjected to too high a temperature before it has substantially dried, there may be a collapse of the foam.

A suitable aerogel for the present invention can be prepared by removing liquid from a silica-based gel under conditions which minimize the shrinkage of the gel's solid structure. The phrase "silica-based" refers to gels made with silicon compounds (such as, for example, tetraethylorthosilicate, silicate or colloidal silica).

Suitable aerogels have a density less than about 0.3, generally in the range of from about 0.05 to about 0.3 grams/mm$^3$ and a thermal conductivity of about 0.03 or less, generally in the range of from about 0.01 to about 0.030 W/mK.

For the present invention the aerogels are hydrophobic, and yet they are combined with an aqueous gelatin foam to form the insulative composites and the insulation described herein. The key to this invention is the preparation of a foam (from the gelatin) which allows the hydrophobic aerogel to be easily and uniformly dispersed and the binder level to be minimized. The consistency which the foam has permits adhesion to the hydrophobic aerogel during drying so that it doesn't "de-wet" or lose adhesion like a non-foamed combination would.

Typical processes for making aerogels minimize shrinkage by using supercritical conditions while drying to form the porous, solid aerogel. The hydrophobic aerogel can therefore, be commercially obtained, or it can be prepared using suitable procedures known to the art, such as those indicated in, for example, U.S. Pat. Nos. 4,954,327; 4,610,863; 2,249,767, and 2,978,298.

The aerogel can be used in any particle size which allows it to be dispersed within the gelatin. It has been found, however, that a composite composition or insulation having an advantageously and remarkably low thermal conductivity can be obtained when the aerogel is used in two different sizes, comminuted powders and larger chunks. Preferably, the large pieces range from about 1 to about 10 mm in diameter. The comminuted aerogel will typically have an average particle size less than 1 mm in diameter. In more preferred embodiments, the powder used has an average particle size less than about 0.5 mm in diameter while the large pieces have an average size greater than 1 mm in diameter. Most preferably, the large pieces are spheres, although the aerogel chunks can have any shape.

In a composite composition, the aerogel could be used in a minimum amount needed to reduce the thermal conductivity of a foam. Acceptably, the aerogel is in the dry composite in at least about 5% by total weight or more, (up to about 98% by wt.) of the dry composite. For insulation the minimum amount is 53% by total wt. In preferred cases (for example, to obtain a low $T^k$) in a composite or insulation, the aerogel is present at an amount in the range of from about 60% to about 98% by total dry wt.

The gelatin can be present at an amount of from about 2% to about 47% by total dry wt.

In addition to the gelatin and aerogel, other ingredients can be included in a composite composition; such as, for example, one or more of the following: fiber, a pesticide, a fungicide, an anti-wicking agent, a gelatin crosslinker, a surfactant, a pigment, a dye, and an opacifier. Although the aerogel concentration is maximized in the most preferred embodiments, such preferred embodiments will also include a gelatin crosslinker, a surfactant, an opacifier, and a fungicide.

The larger pieces of aerogel (at least about 1 mm in diameter) can acceptably be present at an amount of from about 5% to about 98% by total dry wt. Since, however, it is the aerogel that gives the best (lowest) thermal conductivity ($T^k$) value, the insulation and the preferred composites are from about 53% to about 98% by dry weight aerogel.

The liquid ingredients (water, surfactant, dye, etc.) used in the preparation of the foamed composite have to wet out the aerogel in order to form a well mixed, uniform blend for the product. When the aerogel has a sufficiently large surface area to hinder or prevent the aqueous solution from wetting out the particles, then an effective amount of surfactant or surfactant and water can be used to wet the aerogel and form a uniform blend. A failure to wet out the aerogel will generally occur when the aerogel contains high concentrations of fine particles and a low water concentration in the process. The surfactant is a preferred ingredient, therefore, when the amount of water used in the process is between about 35% and 50% by wt.

The gelatin, a degradation product of collagen, has different molecular weights, depending on the degree of degradation. The various gelatins, therefore, have different jelly strengths; these strengths are expressed in Bloom grades. A gelatin is rated with a jelly strength of 1 Bloom grade level if a weight of 1 gram on a ½ inch diameter tup causes the tup to penetrate the gelatin to a depth of 4 millimeters (mm). Commercially available gelatin has strengths from 30 to 300.

The gelatin utilized with the present invention can be commercially obtained or could even be prepared by boiling the animal parts in water. Gelatins having different Bloom grades can be mixed together to obtain a gelatin having a different Bloom grade. The gelatin used for the present invention does have a minimum Bloom of at least about 60. A preferred insulation is made with gelatin having a Bloom level in the range of from about 100 to about 300.

The aqueous gelatin solution which is combined with the aerogel is made by mixing water and the protein gelatin to form a clear mixture (herein also referred to as a gelatin solution). Preferably, dry gelatin is added to water and mixed until a clear solution is obtained. The water and gelatin mixture can be heated to help form the clear solution. Preferably, the temperature used is in the range of from about 33 to about 37° C.

The aqueous gelatin solution provides a minimum of about 2% by dry weight of the gelatin to the composite product. It has been found that at least about 2% by wt of the gelatin is required for the ingredients to stay together and form the product. Acceptably, the gelatin can be used at an amount up to about 47% by dry weight of the composite product, although it is preferred to minimize the amount of gelatin and maximize the amount of the hydrophobic aerogel in the product, especially where the product is insulation. In preferred embodiments, the gelatin will be present at an amount up to about 25% by weight in the dry product.

In other preferred embodiments the insulation can include one or more additives which improve or modify the insulative foam, such as, for example, fiber, a pigment, a dye, an anti-wicking agent, a fungicide, a surfactant, an adhesive, a binder, and an opacifying filler. Such additives, obtainable commercially, can be used to improve tensile strength, modify density, decrease friability, optimize thermal conductivity and even make the wet foam adhesive. Such additives can be combined at any time during the preparation process; amounts ranging from about 0.05 to about 35% by dry weight can be used. They can be added with the aerogel or added to the water along with the gelatin. In the preferred processes the additive will be combined with the gelatin and water if it is a liquid; if it is a solid, it will be mixed into the aqueous gelatin solution along with the aerogel.

Frequently, a preferred additive can perform more than one function; for example, a binder might be used to reduce friability and also act as an opacifier, or a complex dye might be used which also acts as a surfactant, opacifier, improve strength, and/or make the wet foam more adhesive so that it is more easily processed and stays in the mold more easily. Although any dye can be used, it is preferred that the dye is a pourable liquid.

Since the present compositions have a tendency to wick (take in water) anti-wicking agents are used, and in fact are preferred for the insulation. Although gelatin crosslinkers also give protection against wicking, a separate anti-wicking agent can also be included at preferred amounts in the range of from about 0.05% to about 8% by dry weight of the composition.

A surfactant can be included in these compositions to obtain benefits like improved foaming or the wetting of an aerogel. A preferred surfactant for the present invention is sodium lauryl sulfate. A surfactant is preferably included at an amount in the range of from about 0.05% to about 8% by dry weight of the composition.

With the presence of gelatin one preferred additive is a fungicide and/or pesticide. These ingredients can be included at preferred amounts in the range of from about 0.5% to about 8% by dry weight of the composition. Fungicides which can be used include borates (zinc borate and calcium borate) and 1,2-benzisothiazolin-3-one.

Gelatin crosslinker is a preferred additive, and is included to crosslink the proteinaceous gelatin foam, making it more durable, and allowing it to be dried at a higher temperature. Preferred crosslinkers include glutaraldehyde, aziridine, mucochloric acid, and cyanamide. The crosslinker can be added to the water with the gelatin, or combined with the aerogel, or added to the composite mixture during foaming. The gelatin crosslinking agent can be included at an acceptable amount in the range of from about 0.05 to about 25 parts by weight per 100 parts by weight (pph) of the gelatin and preferably from about 0.05 to about 8 pph of the gelatin.

Although binders can be included in any of the embodiments, with the gelatin present at an amount of at least about 2% by total dry weight, no other binder need be present. In fact, the most preferred embodiments of the insulation do not have a binder. If desired, however, a binder can be added. It has been found that a binder will increase the density of the product, while the thermal conductivity values of the product remain low. The binder can be included at an amount in the range of from about 0.1% to about 30% by dry weight of the composition.

Binders which can be used include an inorganic binder such as sodium silicate and an organic polymer-based binder such as a latex. Acceptable latex binders are styrene butadiene rubber, nitrile rubber, carboxylated styrene butadiene rubber, acrylonitrile butadiene rubber, acrylic, carboxylated acrylonitrile butadiene rubber, and silicon rubber latex.

Opacifiers (also referred to as opacifying fillers) can be included to further improve insulation capabilities. Preferably, the opacifier used is inorganic so that the flammability and smoke characteristics of the insulation remain at a low level. A suitable opacifying filler is carbon black, $TiO_2$, $Fe_2O_3$, clay, graphite, silica, and finely ground minerals. The opacifier is preferably selected from the group consisting of: iron oxide, clay, titanium dioxide, and graphite; the most preferred opacifier is iron oxide. The opacifier preferably is included at an amount in the range of from about 0.5% to about 35% by dry weight.

In preferred embodiments fiber is included. Any fiber can be included in the present insulation; preferred amounts are in the range of from about 0.5% to about 20% by dry weight of the composition. The fiber used can be organic or inorganic. The organic fiber can be synthetic or natural. The inorganic fiber could be mineral, metal, or synthetically made non-carbon fiber. Fibers included in the present insulative compositions can be selected from the group consisting of: fiberglass, mineral wool, wollastonite, ceramic, cellulose, carbon, cotton, polyamide, polybenzimidazole, polyaramid, acrylic, phenolic, polyester, polyethylene, polypropylene, and other types of polyolefins. For the insulation the fiber is preferably non-flammable such as, for example, fiberglass.

The following examples are offered to illustrate the present invention. In the Examples, all parts and percentages are by weight unless otherwise indicated; and all measurements of thermal conductivity, unless otherwise indicated, were made at ambient temperatures.

EXAMPLES

In the examples which follow, except where it is otherwise indicated, the thermally insulative foams were prepared according to the following procedure.

Dry, gelatin-forming powder was combined with water. This combination was then stirred and heated (at 33–37° C.) until the dry powder had dissolved (the aqueous mixture was clear). When fibers were being used in the insulation, the fibers were added to the clear, aqueous gelatin and the combination was then agitated to disperse the fibers.

The aerogel was combined with any other dry ingredients being used in the particular sample (carbon black, zinc borate as a fungicide, etc.). These ingredients were then stirred until a uniform mixture was obtained.

As the aerogel and other dry ingredients were being stirred, the clear, aqueous gelatin combination was added. This mixture was then blended rapidly for 75 seconds to produce a wet foam. The foam was then used to fill a molding-frame and was then dried, producing the sample (a molded thermally insulative panel).

In these Examples, unless otherwise indicated, the following ingredients were used: gelatin (type A (Lot GG1144-3H) from Grayslake Gelatin Co.; aerogel beads from BASF (diameters ranging from 1–6 mm); carbon black (Elftex-8) from Cabot Corp.; zinc borate (2B-223) from Climax Performance Materials Corp (polymer additives group) is added as a fungicide/pesticide; surfactant (unless otherwise indicated) is Dawn (from Proctor & Gamble); the carbon black in Sample B was Elftex-8 from Cabot Corp.; $TiO_2$— Pure R-901 from Dupont; graphite—Dixon Graphite M-200 from Dixon Ticonderoga Co.

The particular data obtained for each sample is indicated in the Examples which follow.

Example 1

In accordance with the above described procedure, the following ingredients were used in the amounts indicated.

14 g (grams) of gelatin 275 Bloom;
200 ml (milliliters) of deionized water;
80 g of a hydrophobic aerogel which was derived from tetraethylorthosilicate (TEOS); the aerogel used had an average particle size in the range of from 0.5 to 0.15 mm;
10 g of carbon black;
3 g of zinc borate.

The thermal conductivity was measured using the Hager Thin Foil Test Method (ASTM—C-1114). The sample's thermal conductivity was 0.023 watt/meter-K° (W/mK).

Example 2

An insulative composition having a formulation identical to Example 1 was prepared using the previously described procedure except that the mold was lined with a polyester scrim and a fiberglass scrim. The wet foam was put in the mold between the scrims, and the composite was then allowed to dry.

It was observed that the polyester scrim and the fiberglass scrim stuck to the composite forming a jacket giving added durability, protection, and strength. Using a fibrous scrim on both sides of the composite there was a decrease in flaking and debris which ordinarily would fall from the dried sample.

Example 3

A composite was prepared and molded to form pipe insulation. The wet foam was packed in two semi-circular molds which gave the dried product the shape of a pipe.

In accordance with the above described procedure, the following formulations was used:

| Ingredient | Amount |
| --- | --- |
| gelatin | 14 |
| water | 200 |
| fiberglass | 2.12 |
| aerogel (beads) | 83.3 |
| aerogel (powder) | 41.7 |
| surfactant | 0.5 |
| carbon black | 10.0 |
| zinc borate | 13.0 |
| glutaraldehyde | 2 ml. |

In the above formulation the 2 ml. of a 5% by weight solution of glutaraldehyde in water was added to all of the samples after all of the solids had wetted out and the foam had developed.

In the above formulation all amounts are given in grams. To aid in dispersion, the fiber was wetted before its addition. Approximately 0.43 g of water was used. The water was deionized.

The aerogel powder was obtained by grinding the BASF aerogel beads in an Alpine Mill. This powder had an average particle size in the range of from 0.5 to 0.10 mm The wet foam was packed in 2 identical molds which were shaped as ½ of a pipe. After the foam dried the ½ pipe sample was removed from the mold. The pipe insulation formed from each of the samples had an outer diameter of 3 in. (inch) and an inner diameter of 1 in.

This pipe insulation could be used by putting each half around a pipe having a 1 inch diameter and securing them together with suitable means. Preferred methods which can be used to secure the pipe insulation forms together is 1) cladding; and 2) pressure sensitive strips with adhesive on each side.

Example 4

Samples were prepared using the procedure and formulation of Example 1 except that instead of the carbon black the samples compared three different opacifiers. The $TiO_2$, iron oxide, and graphite in the amounts indicated in the table below. The thermal conductivity was tested (using the Hager Thin Foil Test Method ASTM C-1114) and the amounts are indicated in the table below.

| Ingredient | Sample A | Sample B | Sample C |
|---|---|---|---|
| Iron Oxide | 10 g | — | — |
| TiO$_2$ | — | 10 g | — |
| Graphite | — | — | 10 g |
| T$^k$ (W/mK) | 0.0242 | 0.0262 | 0.0266 |

Example 5

Using the previously described procedure samples were prepared having the aerogel and perlite at weight ratio (in grams) of 80/0 (aerogel to perlite respectively) down to 0/80. The aerogel was a TEOS based aerogel having a particle size ranging from 0.5 mm to 2mm. The perlite was 7, 5, and 3 lb. perlite. The rest of the ingredients and amounts were the same as was used for Example 1 without surfactant and having no glutaraldehyde.

Testing the three grades of perlite at 5 different ratios resulted in 15 different samples; the thermal conductivity of each sample was tested (using the Hager Thin foil Test Method ASTM C-1114) and the results are given below in W/mK.

| Wt. Ratio in g. aerogel/perlite | A) T$^k$ of #7 perlite | B) T$^k$ of #5 perlite | C) T$^k$ of #3 perlite |
|---|---|---|---|
| 1) 80/0 | 0.0228 | 0.0237 | 0.0221 |
| 2) 60/20 | 0.0275 | 0.0263 | 0.0254 |
| 3) 40/40 | 0.0343 | 0.0311 | 0.0334 |
| 4) 20/60 | 0.0424 | 0.0381 | 0.0423 |
| 5) 0/80 | 0.0525 | 0.0452 | 0.0450 |

The above data shows that the worst conductivities are found in the comparison composites having no aerogel present (samples 5A, 5B, and 5C). The best insulation is thus provided by composites having aerogel and gelatin without the other insulative filler (perlite).

Example 6

Using the previously described procedure and the formulation indicated below, 6 different samples were prepared using different blooms of gelatin.

| Ingredient | Amount (in g) |
|---|---|
| water | 200 |
| total gelatin | 14 |
| Zn Borate | 13 |
| Dawn (surfactant) | 0.5 |
| green dye 2.5% by wt. | 5.65 |
| fiber | 2.12 |
| aerogel beads (BASF 1–6 mm) | 83.3 |
| aerogel 1–.1 mm (ground beads) BASF | 41.7 |
| 5% glutaraldehyde in water | 3 ml. |

The gelatin used had the blooms indicated in the table below. Samples D, E and F contained 7 g of each type of gelatin indicated. The thermal conductivity, measured using the Hagar Thin Foil Test Method ASTM C1114), is also indicated for each sample:

| Sample | Bloom Grade | T$^k$ (W/mK) |
|---|---|---|
| A | 60 | 0.0239 |
| B | 150 | 0.0241 |
| C | 275 | 0.0247 |
| D | 60/150 | 0.0237 |
| E | 60/275 | 0.0241 |
| F | 150/275 | 0.0232 |

Example 7

The formulation and procedure which was used for Example 1 was repeated with the exception that 2.14 g of polyvinylalcohol fibers (Kuralon VPB ⅛ in. long from Kurary Co. Ltd.) were added.

The thermal conductivity of this sample was found to be 0.028 (using the Hagar Thin Foil Test Method ASTM—C1114).

Example 8

To demonstrate a composite having cellulose fibers a sample was prepared using the procedure described previously. The following formulation was used:

| Ingredient | Amount (in g) |
|---|---|
| water | 125 |
| gelatin | 14 |
| Zn Borate | 13 |
| Dawn (surfactant) | .115/0.5 |
| cellulose fiber | 2.12 |
| aerogel beads 1–6 mm (BASF) | 83.3 |
| aerogel 1–.1 mm ground (BASF) | 41.7 |
| 1% glutaraldehyde in water - .1 g/10 ml | 3 ml. |

The gelatin was 50% by weight 150 Bloom and 50% by weight 275 Bloom.

The thermal conductivity was measured using the Hagar Thin Foil Test Method ASTM C1114). The thermal conductivity of the sample was 0.023 W/mK. The density was 7.21 lb/ft$^3$.

Example 9

Insulation was prepared using the procedure previously described. In this sample only powdered aerogel was included and a surfactant was used. The following formulation was used:

10 g (grams) of 275 Bloom gelatin;

10 g of 150 Bloom gelatin;

200 ml (milliliters) of deionized water;

125 g of aerogel which was ground to a powder in an ACM Mill. The particle sizes of the powder was a maximum of 0.5 mm;

10 g of carbon black;

3 g of zinc borate;

1.5 g of surfactant (dishwashing liquid Dawn™ from Proctor & Gamble) added to the aqueous gelatin.

The insulation sample was found to have a density of 7.42 lb/ft$^3$ and a thermal conductivity of 0.0262 watt/meter-K° (W/mK). The thermal conductivity of sample A was measured using the Hager Thin Foil Test Method (ASTM C-1114).

Example 10

The formulation and procedure of Example 9 was used except that here, only aerogel beads were used. The aerogel beads (from BASF) had diameters in the range of from about 1 to about 6 mm. The insulation was tested and was found to have a density of 5.75 lb/ft$^3$ and a thermal conductivity of 0.0267 W/mK, measured using the Hager Thin Foil Test Method (ASTM C-1114).

Example 11

The formulation and procedure of Example 10 was used except that no surfactant was used. The sample prepared was found to have a density of 7.20 lb/ft$^3$ and a thermal conductivity of 0.0242 W/mK, measured using the Hager Thin Foil Test Method (ASTM C-1114).

The results of this example demonstrates that by eliminating the surfactant less foaming will be obtained in the product resulting in a higher density. With aerogel beads and no surfactant a lower conductivity is also obtained.

Example 12

The formulation and procedure to make this insulative sample was identical to Ex. 11 except that it contained 83.3 g of the BASF aerogel beads and 41.7 g of the ground aerogel powder (BASF beads ground in an Alpine Mill to a particle size in the range of from 0.5 to 0.15 mm).

The sample prepared was tested and found to have a density of 7.93 lb/ft$^3$ and a thermal conductivity of 0.0238 W/mK (using the Hager Thin Foil Test Method (ASTM C-1114) for thermal conductivity.

In comparing this example to Ex. 11, it is noteworthy that the best insulative results are obtained with the sample which had the aerogel present both as a powder and as beads.

Example 13

A series of insulation samples were prepared using the procecure previously described. Samples A–I were prepared using the ingredients and amounts indicated. The amount of gelatin used for each sample was varied for comparison.

The following formulation was used for the samples:

200 ml (milliliters) of deionized water;

125 g of a hydrophobic aerogel from BASF (83.3 g of the BASF aerogel beads were added as beads 1–6 mm; the remaining 41.7 g of the aerogel beads which were ground into a powder with a particle sizes in the range of from 0.1 to 0.5 mm);

10 g of carbon black;

3 g of zinc borate;

2 ml of 5% glutaraldehyde (crosslinker) in an aqueous solution.

The gelatin used for each sample was 50% by weight (wt.) 275 Bloom and 50% by weight 150 Bloom. The total amount of gelatin used for each sample is indicated below (in grams) along with the density and conductivity measurements obtained for each sample. The density measurement is in lb/ft$^3$; conductivity was measured using the Hager Thin Foil Test Method (ASTM C-1114).

| Sample | Gelatin | Density | T$^k$ (W/mK. °) |
|---|---|---|---|
| A | 18 | 8.62 | 0.0235 |
| B | 16 | 8.10 | 0.0231 |
| C | 14 | 8.92 | 0.0228 |
| D | 12 | 8.99 | 0.0225 |
| E | 10 | 9.11 | 0.0218 |
| F | 8 | 9.18 | 0.0212 |
| G | 6 | 9.15 | 0.0201 |
| H | 4 | 8.60 | 0.0197 |
| I | 2 | 8.86 | — |

Sample I was too weak to be measured for the T$^k$ to be measured.

Example 14

In accordance with the above described procedure, a sample was pepared which combined a latex binder at a gelatin concentration less than about 2%. The following formulation was used in the previously described procedure:

| Ingredient | Amount (in grams) |
|---|---|
| gelatin | 2.0 |
| silicon latex 35% solid | 5.71 |
| water | 200.0 |
| wet fiberglass (2.12 g dry) | 2.65 |
| aerogel (beads) | 83.3 |
| aerogel (powder) | 41.7 |
| carbon black | 10.0 |
| zinc borate | 3.0 |

The silicon latex was SM2059 from General Electric.

This formulation made damp crumbs which were pressed together into a mold and dried at room temperature. The sample, however, fell apart when dry and was discarded. At a gelatin content of 1% by wt. (less than the 2% by weight level) even the addition of the silicone latex binder failed to make a sample that would stay together.

Example 15

Using the procedure previously described, three samples were prepared, each having a different binder used at the identical concentration. The formulation and T$^k$ of each sample is given below.

The following formulation was used for the samples:

200 ml (milliliters) of deionized water;

125 g of a hydrophobic aerogel from BASF, (83.3 g of the BASF aerogel beads were added as beads 1–6 mm; the remaining 41.7 g of the aerogel were beads ground into a powder with particle sizes in the range of from 0.1 to 0.5 mm);

3.1 g of each latex (by dry weight)

0.5 g of Dawn (as a surfactant from Proctor & Gamble);

13 g of zinc borate;

3 ml of 5% glutaraldehyde in an aqueous solution;

5.65 g of green dye (2.5% solids);

2.65 g of ⅛ in. chopped, wet fiberglass (2.21 g dry weight);

14 g of gelatin which was 7 g of the 275 Bloom and 7 g of the 150 Bloom.

The following binders were used:

Sample A had silicone latex (SM 2059 from General Electric);

Sample B had carboxylated styrene-acrylonitrilebutadiene rubber latex (L-4 from BASF); and Sample C had acrylic latex (L-23 from B.F. Goodrich).

|  | Sample A | Sample B | Sample C |
|---|---|---|---|
| density | 9.06 lb/FT$^3$ | 5.86 lb/FT$^3$ | 5.33 lb/FT$^3$ |
| T$^k$ W/mK | 0.0223 | 0.0243 | 0.0242 |

Example 16

Using the procedure previously described, a sample was was prepared with the silicon latex binder (SM 2059 from General Electric). The formulation and T$^k$ of the sample is given below.

- 200 ml (milliliters) of deionized water;
- 125 g of a hydrophobic aerogel from BASF; (83.3 g of the BASF aerogel beads were added as beads 1–6 mm; the remaining 41.7 g of the aerogel were beads ground into a powder with particle sizes in the range of from 0.1 to 0.5 mm);
- 8.86 g of silicon latex as a binder (on a dry weight basis the latex was 3.1 g, the remainder of the weight being water);
- 13 g of zinc borate;
- 3 ml of 5% glutaraldehyde in an aqueous solution;
- 5.65 g of green dye (2.5% solids);
- 14 g of gelatin which was 50% by weight (wt.) 275 Bloom and 50% by wt. 150 Bloom, type A;
- 2.65 g of ⅛ in. chopped, wet fiberglass (2.21 g dry weight).

The sample prepared was tested and found to have a density of 10.55 lb/ft$^3$ and a thermal conductivity of 0.0211 W/mK (using the Hager Thin Foil Test Method (ASTM C-1114) for thermal conductivity.

Example 17

Using the procedure previously described, a sample was prepared using the opacifier iron oxide and the aerogel in both beads and in comminuted form. The formulation and T$^k$ of the sample is given below:

- 125 g of deionized water;
- 125 g of a hydrophobic aerogel from BASF (83.3 g of the BASF aerogel beads were added as beads, 1–6 mm; the remaining 41.7 g of the aerogel were beads ground into a powder with substantially all of the particle sizes in the range of from 0.1 to 0.5 mm);
- 3 g of zinc borate;
- 10 ml. of 1% glutaraldehyde in an aqueous solution;
- 14 g of gelatin which was 50% by weight (wt.) 275 Bloom and 50% by wt. 150 Bloom, type A;
- 5.7 g of a 2% by wt. solution of sodium lauryl sulfate;
- 10 g of iron oxide.

The sample prepared was tested and found to have a density of 7.62 lb/ft$^3$ and a thermal conductivity of 0.0224 W/mK (using the Hager Thin Foil Test Method (ASTM C-1114) for thermal conductivity.

What is claimed is:

1. A process for making a thermally insulative foamed composition which comprises combining aqueous gelatin and particles of an inorganic, hydrophobic aerogel to form a mixture, agitating the mixture to form a wet foam, and drying the wet foam, wherein the gelatin is present at an amount of at least about 2% by dry weight, the said gelatin having a minimum Bloom of at least about 60, and the aerogel being present at an amount of at least about 5% by dry weight, wherein further there is a sufficient amount of water in the mixture to wet the hydrophobic aerogel and also allow the mixture to foam.

2. The process of claim 1 wherein the water is present at a maximum of about 60% by total processing weight.

3. The process of claim 1 wherein the mixture being agitated contains water at an amount in the range of from about 35 to about 75% by weight.

4. The process of claim 1 wherein the aerogel is present at an amount in the range of from about 5 to about 98% by dry weight, and the dry weight of gelatin in the wet foam is in the range of from about 2 to about 47% by dry weight, and the wet foam is dried to form thermal insulation.

5. The process of claim 4 wherein a gelatin crosslinker and an opacifier is also combined with the aerogel and the aqueous gelatin, wherein further the opacifier is present in the mixture at an amount in the range of from about 0.5 to about 35% by dry weight, and the gelatin crosslinker is present in the mixture at an amount in the range of from about 0.05 to about 25 parts by weight per hundred parts by weight of the gelatin.

6. The process of claim 4 wherein a fungicide, a surfactant, a gelatin crosslinker and an opacifier are also combined with the aerogel and the aqueous gelatin, wherein further the fungicide is present at an amount in the range of from about 0.5 to about 8% by dry weight of the total composition, the surfactant is present at an amount in the range of from about 0.05 to about 8% by dry weight of the total composition, the gelatin crosslinker is present at an amount in the range of from about 0.05 to about 8 parts by weight per hundred parts by weight of the gelatin, the opacifier is present at an amount in the range of from about 0.5 to about 35% by dry weight of the total composition, and the mixture being agitated contains water at an amount in the range of from about 35 to about 75% by total weight.

7. A thermally insulative composition which comprises a dried foam of a gelatin and a hydrophobic aerogel; wherein the gelatin is present at an amount of at least about 2% by total weight, the said gelatin having a minimum Bloom of at least about 60, and the hydrophobic aerogel is present at an amount of at least about 5% or more by total weight.

8. The composition of claim 7 wherein the hydrophobic aerogel has a density less than about 0.30 grams/mm$^3$ and a thermal conductivity less than about 0.030 W/mK.

9. The composition of claim 7 wherein the dried foam also contains one or more of the following: fiber, a pesticide, a fungicide, an anti-wicking agent, a gelatin crosslinker, a surfactant, a pigment, a dye, and an opacifier.

10. The composition of claim 7 wherein the gelatin is crosslinked by a gelatin crosslinker present at an amount in the range of from about 0.05 to about 25 parts by weight per 100 parts by weight of gelatin.

11. The composition of claim 7 wherein the dried foam also contains fiber at an amount in the range of from about 0.1 to about 25% by total weight.

12. The composition of claim 7 wherein the dried foam contains an opacifier at an amount in the range of from about 0.05 to about 35% by total weight, a fungicide at an amount in the range of from about 0.05 to about 35% by total weight, and an anti-wicking agent at an amount in the range of from about 0.05 to about 35% by total weight of the foam.

13. The process of claim 4 wherein the hydrophobic aerogel particles are in two different sizes: pieces having a diameter in the range of from about 1 to about 10 millimeters and pieces having a diameter less than about 1 millimeter in diameter.

14. A process for making a thermally insulative foamed composition which comprises combining aqueous gelatin and particles of an inorganic, hydrophobic aerogel to form a mixture, agitating the mixture to form a wet gelatin foam, and drying the wet gelatin foam, wherein the gelatin is present at an amount of at least about 2% by dry weight, the said gelatin having a minimum Bloom of at least about 60, and the aerogel being present at an amount of at least about 5% by dry weight, wherein further there is a sufficient amount of water in the mixture to wet the hydrophobic aerogel and also allow the mixture to foam, further providing that the hydrophobic aerogel particles are in two different sizes: pieces having a diameter in the range of from about 1 to about 10 millimeters and pieces having a diameter less than about 1 millimeter in diameter.

15. The process of claim 14 wherein the gelatin foam is crosslinked by a gelatin crosslinker present at an amount in the range of from about 0.05 to about 25 parts by total dry weight per hundred parts by weight of the gelatin.

16. A thermally insulative composition which comprises a dried foam of a gelatin and hydrophobic aerogel particles; wherein the gelatin is present at an amount of at least about 2% by total weight, the said gelatin having a minimum Bloom of at least about 60, and the hydrophobic aerogel is present at an amount of at least about 5% or more by total weight, further providing that the hydrophobic aerogel particles are in two different sizes: pieces having a diameter in the range of from about 1 to about 10 millimeters and pieces having a diameter less than about 1 millimeter in diameter.

17. The composition of claim 16 wherein the gelatin foam is crosslinked by a gelatin crosslinker present at an amount in the range of from about 0.05 to about 25 parts by total dry weight per hundred parts by weight of the gelatin.

* * * * *

UNITED STATES PATENT AND TRADEMARK OFFICE
CERTIFICATE OF CORRECTION

PATENT NO. : 6,136,216
DATED : Oct. 24, 2000
INVENTOR(S) : Carrielee Fidler; Thomas C. Simonton It is certified that error appears in the above-identified patent and that said Letters Patent is hereby corrected as shown below:

On the title page, in the assignee information, delete "Armacell, LLC Germany" and insert -- Armacell Enterprise GMBH, Germany.

Signed and Sealed this

Twenty-ninth Day of May, 2001

Attest:

NICHOLAS P. GODICI

Attesting Officer

Acting Director of the United States Patent and Trademark Office